UNITED STATES PATENT OFFICE 2,617,327

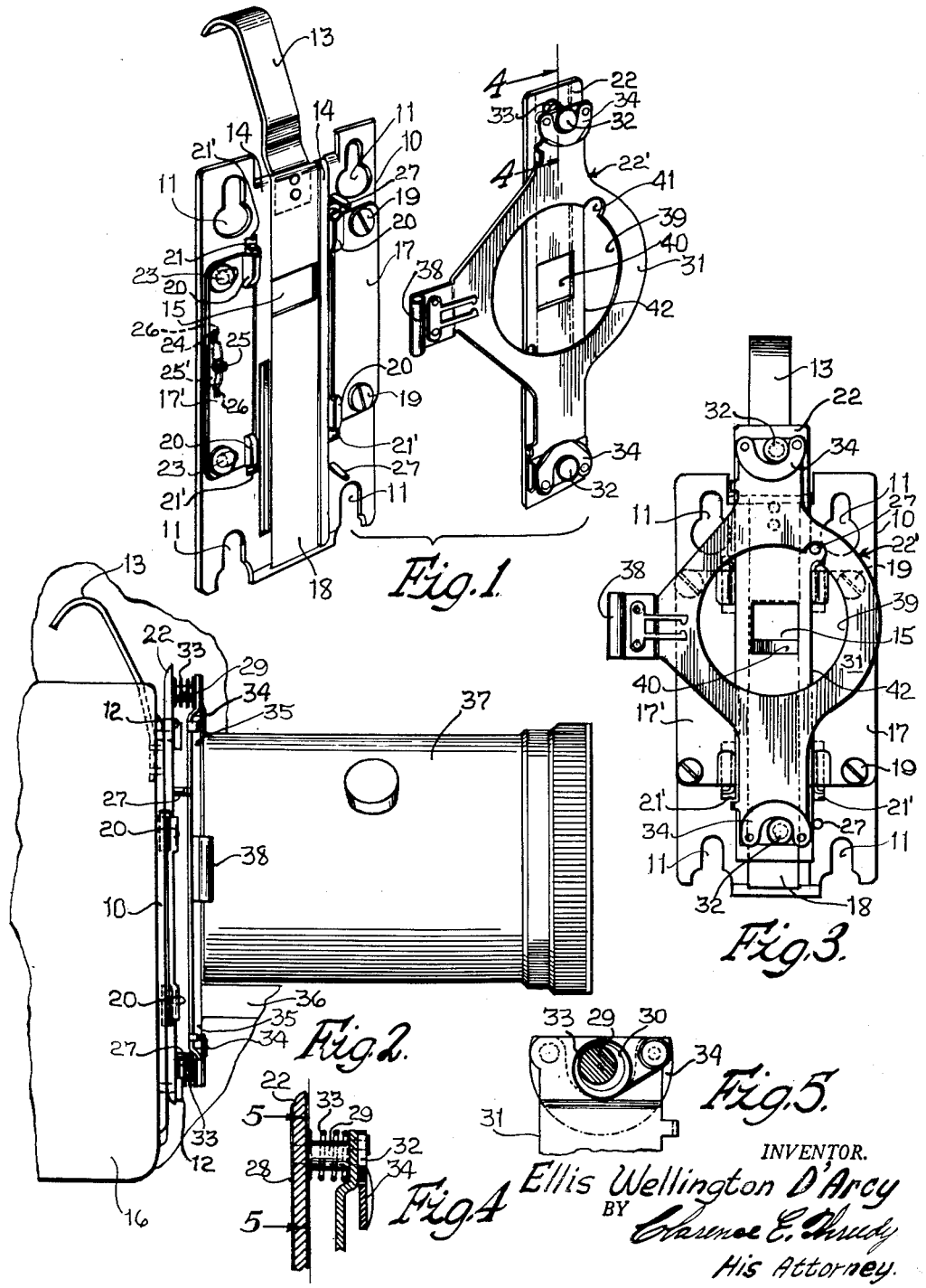

FILM PRESSURE SHOE AND APERTURE PLATE ASSEMBLY FOR MOTION-PICTURE PROJECTING APPARATUS

Ellis Wellington D'Arcy, Chicago, Ill., assignor to De Vry Corporation, Chicago, Ill., a corporation of Illinois Application September 9, 1950, Serial No. 184,029

1 Claim. (Cl. 88—17)

This invention relates to new and useful improvements in a film pressure shoe and aperture plate assembly for motion picture projecting apparatuses.

As such, the invention has as its object the provision of an assembly of this character which will be highly efficient in use and economical in manufacture.

A principal object of the invention is to provide a simple arrangement for effectively and properly aligning the pressure plate of the shoe in parallel confronting relation with respect to the aperture plate whereby to impose on a film strip an effective uniform pressure for proper film moving operation.

Another object of this invention is to provide in the hereinbefore referred to assembly a pressure plate which is self-aligning with respect to the film channel of the aperture plate.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the aperture plate and pressure shoe embodying my invention showing the same in exploded relation with respect to each other;

Fig. 2 is a fragmentary side elevational view of a lamp housing and projecting lens housing showing my improved film pressure show and aperture plate assembly mounted in an operative position with respect to the lamp housing and projecting lens housing;

Fig. 3 is a front elevational view of the pressure shoe and aperture plate in assembled relation with respect to each other;

Fig. 4 is a fragmentary sectional detail view taken substantially on line 4—4 of Fig. 1; and Fig. 5 is a fragmentary sectional detail view taken substantially on line 5—5 of Fig. 4.

Referring particularly to the drawings the film aperture plate is indicated at 10 and is formed from an elongated relatively flat piece of material provided at its upper and lower end portions with bayonet slots 11 which are adapted to receive the shanks of mounting studs 12 carried by the lamp housing and by means of which the plate 10 is mounted in position upon the housing. These bayonet slots 11 permit ready removal of the plate 10 from mounted position. To facilitate this movement I provide a finger piece 13.

The longitudinal medial portion of the plate 10 provides a film channel having extending along its opposite longitudinal edges tracks 14 over which the long edge portions of a film strip (not shown) pass when intermittently fed through the channel in a manner well known in the art. As these tracks 14 are raised from the bottom wall of the channel the film strip will be relieved of frictional contact with such bottom wall, thereby to allow smooth movement of the film strip through the channel.

The plate 10 provides a light aperture 15 for projection of the light from the light source within the lamp housing 16 to which the studs 12 are attached. Along opposite side edge portions of the plate 10 there are mounted elongated guide plates 17 and 17' which together form a pressure plate channel corresponding to the width of the film channel 18 provided by the plate 10. The plate 17 is mounted in position upon the plate 10 by attaching screws 19. This plate 17 like the plate 17' provides abutments 20 which are turned inwardly, with their inner end portions 21 projecting into the slots 21' formed in the plate 10. These abutments 20 are adapted to be engaged by a plate 22 of a pressure shoe 22' hereinafter more fully described, and which shoe includes a mounting plate 31.

The plate 17' is attached to the plate 10 by slot and screw connections 23 and is normally held in position with the inturned ends of the abutments 21 thereof engaging an adjacent edge of the slots 21' by means of a spring 24 having a coil embracing a pin 25 working in a slot 25' and end portions engaging in notches 26 formed in the plate 10. The function of the spring 24 is to resist outward lateral movement of the plate 17'.

At one side edge of the film channel 18 there are provided lateral spaced studs 27. These studs 27 are adapted to engage the plate 22 of the pressure shoe 22' to guide the plate into proper position 18 upon the tracks 14.

This plate 22, like the plate 10, provides along its longitudinal edges tracks 28 which are adapted to be superimposed upon the adjacent long edges of the film strip over the tracks 14.

The plate 22 at its opposite end portions carries lateral studs 29 which project through enlarged openings 30 formed in the mounting plate 31 of the pressure shoe. The studs carry heads 32 by means of which withdrawal of the stud 29 from the openings 30 is prevented. The pressure plate 22 is yieldably spaced from the mounting plate 31 by means of expansion springs 33 disposed between these plates and embracing the studs 29.

Suitable clips 34 are provided at opposite ends of the mounting plate 31. By means of these clips 34 the pressure shoe is removably attached to lateral extensions 35 of a projecting lens housing supporting bracket 36, the projecting lens housing being indicated at 37. To facilitate removal of the pressure shoe from mounted position upon the extensions 35 I provide a suitable finger piece 38.

The mounting plate 31 has an enlarged opening 39 exposing the picture aperture 40 formed in the plate 22, which aperture 40 is adapted to register with the aperture 15 of the plate 10.

A notch portion 41 is formed in the mounting plate 31 and communicates with the opening 39 thereof. This permits entrance into the notch 41 of the uppermost stud of the studs 27. The openings 30 being of a larger diameter than the diameter of the studs 29, permit a limited lateral movement between the plate 22 and the mounting plate 31.

In mounting the pressure shoe 22' upon the aperture plate 10 the edge 42 of the pressure plate 22 will engage the studs 27 and as these studs are slightly tapered longitudinally the studs will guide the pressure plate into a proper position with the tracks thereof in superimposed relation with respect to the confronting tracks of the plate 10.

By this arrangement the pressure plate 22, during the mounting of the pressure shoe in place is self-aligning. Should for any reason the pressure plate 22 be out of proper position upon the mounting plate 31 the engagement of the pressure plate 22 with the guide studs 27 will effect self-alignment of the pressure plate upon the aperture plate with the tracks thereof in proper confronting position with respect to those of the plate 10. The springs 33 afford the necessary pressure of the plate 22 with respect to the film strip.

By this arrangement I have provided a relatively simple means for effecting proper and accurate superimposing of the pressure plate upon the aperture plate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

In the combination, an aperture plate having longitudinally extending parallelly related film tracks, a removable pressure shoe comprising a pressure plate, the latter having longitudinally extending parallelly related film tracks adapted for confronting position with respect to the tracks of the aperture plate, plate members on opposite sides of the tracks of the aperture plate providing therebetween a channel for the pressure plate, means for fixedly connecting one of said plate members to said aperture plate, means slidably connecting the other of said plate members to said aperture plate, said other plate member adapted to be moved laterally from said channel-forming position by the pressure of one longitudinal edge of said pressure plate when the same is moved into confronting relation with respect to said aperture plate, and spring means carried by said aperture plate and engaging said other plate member for sliding said other plate member into channel-forming position with respect to said one plate member, said members at opposite end portions on confronting longitudinal edges having abutment members engageable with the long edges of the pressure plate, and tapered pin members carried by the aperture plate at one side of said channel and extending outwardly beyond the abutment members of said one plate member and adapted for engagement with a long edge of the pressure plate for deflecting said pressure plate adjacent said abutment of said one plate member and into said channel with the tracks thereof in confronting relation with respect to the tracks of said aperture plate.

ELLIS WELLINGTON D'ARCY.

REFERENCES CITED

The following references are of record in the file of this patent:

UNITED STATES PATENTS

| Number | Name | Date |
|---|---|---|
| 2,229,454 | Holmes | Jan. 21, 1941 |
| 2,232,811 | Sperry | Feb. 25, 1941 |
| 2,425,217 | Wienke | Aug. 5, 1947 |
| 2,485,709 | Davock | Oct. 25, 1949 |

FOREIGN PATENTS

| Number | Country | Date |
|---|---|---|
| 512,454 | Great Britain | Sept. 15, 1939 |
| 940,348 | France | May 18, 1948 |